United States Patent [19]
Rao et al.

[11] 3,979,375
[45] Sept. 7, 1976

[54] FRACTIONATION OF THE WHOLE WHEAT KERNEL BY PIN MILLING

[75] Inventors: Ganta V. Rao; Wayne E. Henry; David L. Hammond, all of Hutchinson, Kans.

[73] Assignee: Far-Mar-Co., Inc., Hutchinson, Kans.

[22] Filed: May 7, 1974

[21] Appl. No.: 467,803

[52] U.S. Cl. ............................ 260/112 G; 241/8; 241/9; 426/436; 426/482; 426/483; 426/484; 426/507
[51] Int. Cl.² ........................................ A23J 1/12
[58] Field of Search .......... 426/455, 481, 482, 483, 426/484, 507, 436; 241/55, 8, 9, 188 A; 260/112 G

[56] References Cited
UNITED STATES PATENTS

| | | | |
|---|---|---|---|
| 2,288,902 | 3/1944 | Callaghan et al. | 260/112 G |
| 2,504,962 | 12/1944 | Burdick | 260/112 G |
| 2,712,416 | 7/1955 | Beushausen | 241/55 |
| 2,742,235 | 4/1956 | Moen | 241/9 |
| 2,863,771 | 12/1958 | Ferrara | 260/112 G |
| 2,895,831 | 7/1959 | Zacharia | 260/112 G |
| 2,957,632 | 10/1960 | Sullivan et al. | 426/481 |
| 3,430,872 | 3/1969 | Conley et al. | 241/55 |
| 3,788,861 | 1/1974 | Durst' | 426/484 X |
| 3,790,553 | 2/1974 | Rao et al. | 260/112 G |
| 3,857,987 | 12/1974 | Rogols et al. | 426/481 |

*Primary Examiner*—S. Leon Bashore
*Assistant Examiner*—M. Steven Alvo
*Attorney, Agent, or Firm*—Stuart J. Friedman

[57] ABSTRACT

A process for fractionating the whole wheat kernel into its bran, germ and endosperm components includes the steps of tempering the wheat kernel in water, pin milling the wheat kernel, sifting the milled kernal to separate the germ and bran components from the endosperm, hydrating and agitating the endosperm to just saturate it and to form a thick, dough-like mass and mechanically working, by kneading, cutting and stretching, the dough-like mass while continuously washing it with water to separate the non-gluten endosperm components from the gluten. The bran and germ components can be separated from each other by conventional gravity table techniques.

15 Claims, 4 Drawing Figures

FRACTIONATION OF THE WHOLE WHEAT KERNEL BY PIN MILLING

BACKGROUND OF THE INVENTION

1. Field of the Invention

The present invention relates to the separation of vital wheat gluten and starch and, more particularly, to a wet process for fractionating vital wheat gluten, starch, bran and germ from the whole wheat kernel with minimum damage to the functional, chemical and biological characteristics of the wheat kernel components.

2. Description of the Prior Art

The commercial production of vital wheat gluten and the separation of starch therefrom has been accomplished in the past using wheat flour or second clears (a small fraction of the flour stream) as the starting material by the "dough ball" process and modifications thereof, which processes essentially separate the wheat starch from the gluten protein. In one process, the gluten is maintained as a single coherent mass and the starch is washed out of a flour and water dough. Another process disperses the dough in water and recovers the gluten particles on a screen. Variations of the basic dough ball process utilizing wheat flour account for all of the vital gluten produced commercially today.

No known gluten production process employs the whole wheat kernel as the starting material. This is probably because production of vital wheat gluten is a comparatively recent innovation which developed from starch recovery processes. Early starch recovery processes utilized the whole wheat kernel but could not be converted to gluten production because the process conditions were too harsh and destroyed or devitalized the gluten. On the other hand, dough ball or batter processing from wheat flour was relatively simple because the bran and the germ had been substantially removed in the milling process. In addition, high ash second clears worked well in the dough ball process and were available at attractive prices as a by-product of the flour milling industry. Consequently, wheat gluten processing has been flour oriented for decades and no need has apparently existed to motivate the development of a process starting from the whole wheat kernel. However, improvements in milling techniques coupled with a drastic decline in the number of operative flour mills has led to current shortages of and higher prices for clears. In fact, millions of pounds of vital wheat gluten are imported by the United States each year to meet demands domestic producers cannot fill.

On process for vital wheat gluten-starch separation and gluten recovery which utilizes the whole wheat kernel as the starting material is taught in U.S. Pat. No. 3,891,613. According to that process the whole wheat kernel is tempered in water and flaked and the flakes are thereafter hydrated to saturation to form a thick, dough-like mass and mechanically worked in the presence of water to wash the wheat kernel components from the gluten. However, the continuous processing of the whole wheat kernel in water during hydrating and mechanical working has been found to cause a pigmentation transfer from the bran and germ to the final dried products of the process. The resulting coloration of the products is undesirable for aesthetic reasons and may cause reduction in product shelf life. In addition, flaking of the tempered whole wheat kernel in a flaking or roller mill has been found to cause needless damage to the starch component of the kernel.

SUMMARY OF THE INVENTION

It is, therefore, an object of the present invention to provide a vital wheat gluten, starch, bran and germ fractionation process which utilizes the whole wheat kernel as the starting material and which reduces or eliminates excessive damage to the starch component.

It is another object of the present in invention to provide a fractionation process in which undesirable pigmentation transfer from the bran and germ to the process products is wholly eliminated.

Other objects and advantages will become apparent from the following description and appended claims.

Briefly stated, in accordance with the aforesaid objects, the present invention provides a process for fractionating the whole wheat kernel, and, particularly, for separating wheat gluten from the starch component of the whole wheat kernel with minimum damage to the physical, chemical and biological properties of the kernel components. According to the process, as can be seen in FIG. 1, the whole wheat kernel is tempered in water and then pin (impact) milled to reduce the particle sizes of the kernel components. The milled particles are sifted to effect a separation between the endosperm on one hand and the bran and germ on the other. The bran and germ are further processed by modified gravity table techniques to separate the bran from the germ, and the endosperm particles are hydrated and agitated in a limited quantity of water just sufficient to achieve saturation of the endosperm. The bulk of the starch is separated from the gluten in the hydrated endosperm in a dough washer wherein the endosperm is mechanically worked in a perforated trough while being continuously washed by a high pressure water spray. Final purification of the gluten is achieved by simultaneously cutting and stretching the gluten in a gluten washer while continuously exposing the gluten mass to wash water in a perforated trough.

It has been found that use of pin (impact) milling, as contrasted with hammer or roller milling, substantially improves the endosperm-bran/germ separation and reduces the damage to the starch component of the kernel. Moreover, by sifting the milled kernel, the bran/germ components are separated from the endosperm prior to water processing (i.e. hydrating and washing). Separation at this point in the process precludes undesirable pigmentation transfer while, at the same time, reducing substantially the quantity of water needed for processing. A critical aspect of the process is controlling the water quantity used to saturate the endosperm to assure that a thick mass, rather than a thin slurry, results. Generally, the addition of a quantity of water from 65 to 75% by weight of the endosperm to be hydrated will assure that the resulting mass is suitable for effective gluten-starch separation.

BRIEF DESCRIPTION OF THE DRAWINGS

The invention will be better understood from the following description taken in conjunction with the accompanying drawings.

DETAILED DESCRIPTION OF THE INVENTION

Figure 1:
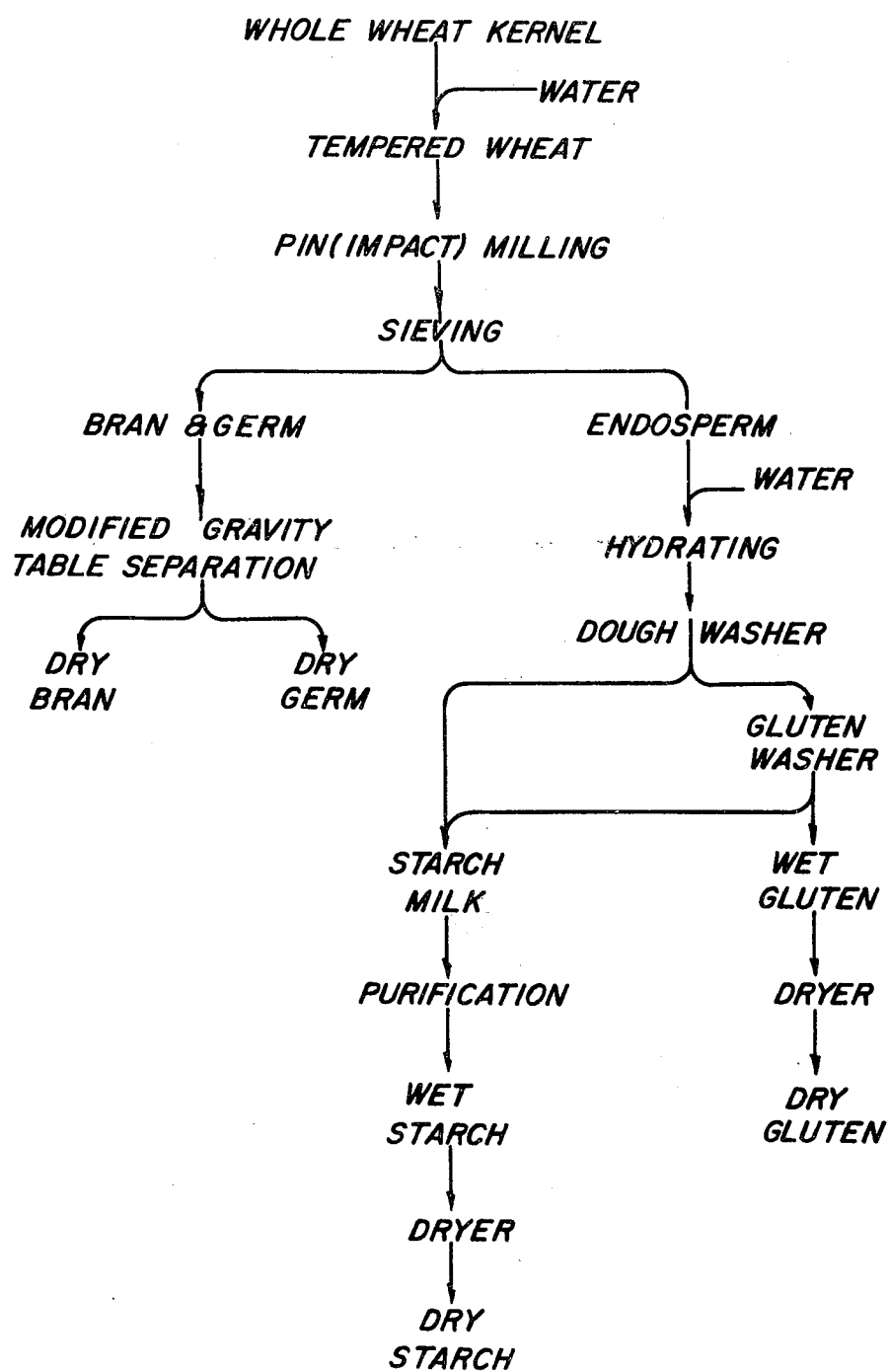
FIG. 1 is a block flow diagram of one form of the present invention.
Figure 2:
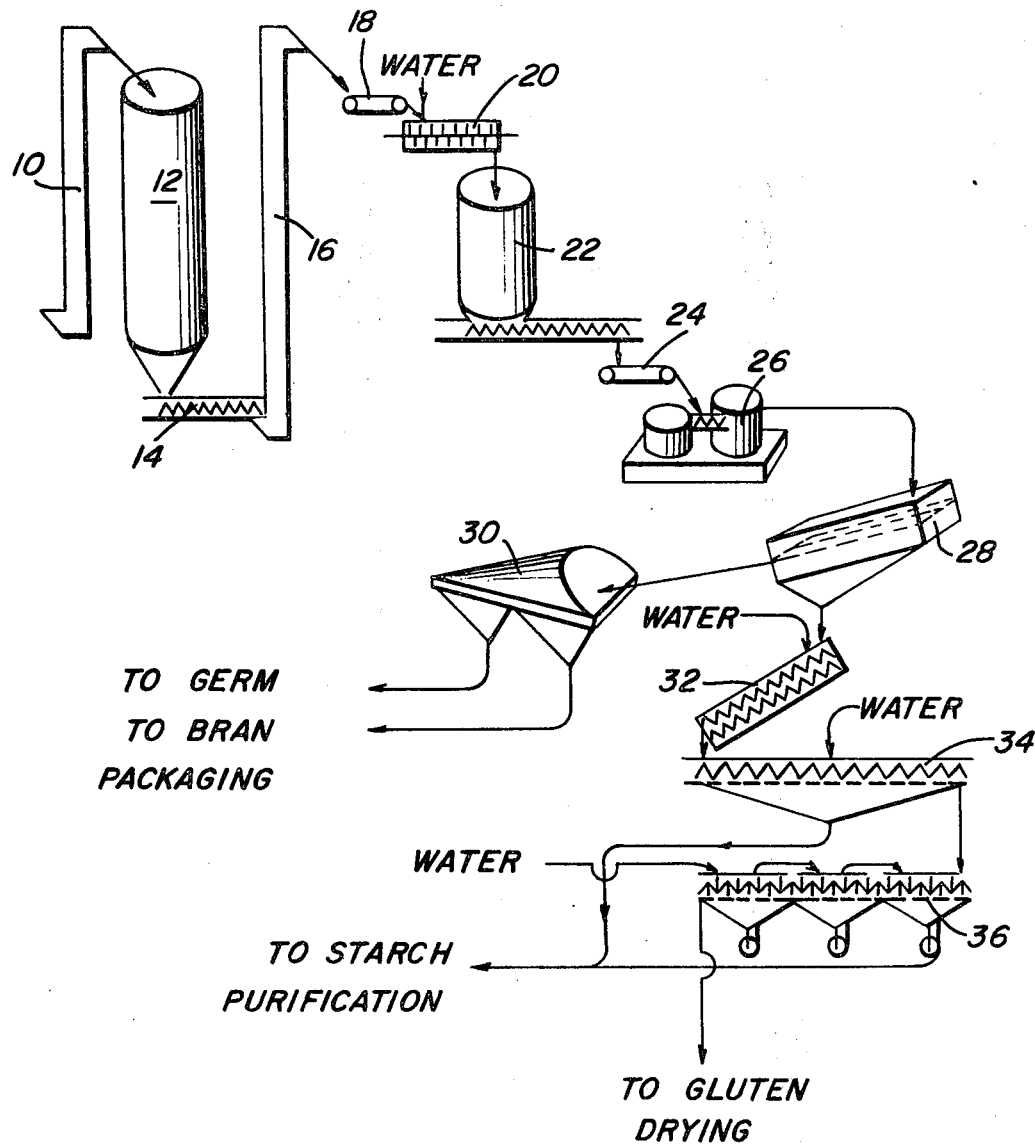
FIG. 2 is a flow diagram of the present process showing in schematic views the equipment used.

The present invention is directed primarily to fractionation of the whole wheat kernel into its major components and, particularly, to the separation of vital wheat gluten therefrom instead of from wheat flour, as is presently the practice. Aside from considerations of availability, there are a number of distinct advantages incident to starting from the whole wheat kernel. Essentially all of the gluten in the wheat is recoverable from the whole wheat kernel, while processing of wheat flour, by its nature, can recover only the gluten in the by-product clears. Moreover, the whole wheat kernel offers a stable supply of raw material with dependable and predictable physical and chemical characteristics. On the other hand, wheat flour is a by-product of differing milling techniques and is neither a uniform nor a stable raw material. In addition, processing the whole wheat kernel produces a greater yield of high quality gluten per bushel of wheat processed.

The first step of the present process comprises tempering the whole wheat kernel in water with intermittent mixing to achieve a kernel moisture content in the range, by weight, from about 12 to 30%. Unprocessed whole wheat kernels have a moisture content generally in the range from about 11.2 to 14%. Tempering in accordance with the present process involves immersing the kernels in water for a period of time sufficient to allow the kernels to take-up the necessary water to reach the desired moisture content. It is preferred, although not required, to temper the kernels in precisely the amount of water necessary to reach the desired water content. This avoids loss of water soluble protein, particularly from the bran, which could remain in any left-over tempering water. Tempering is a relatively slow process, it having been found, for example, that immersion of the kernels in water at room temperature, i.e. about 68°F., requires about 12–24 hours to reach saturation (45–50% moisture). However, the tempering rate can be increased by heating. If the tempering solution is heated, care must be exercised to maintain the temperature below a value where the gluten may become damaged. Gluten damage will occur at about 140°F., or, after prolonged heating, at temperatures above 120°F.

Tempering is preferably employed in one embodiment of the present process to increase the moisture content of the kernel to no more than about 22% water by weight, although tempering to about 14–18% moisture has been found to be optimum in terms of minimum starch damage and maximum endosperm yields following milling. If the moisture content of the kernel is increased to beyond 18%, endosperm separation by sieving becomes difficult. If the moisture content of the kernel is increased beyond 22% by weight at this early stage of the processing, the possibility of microbial growth is substantially enhanced. Accordingly, tempering to the range 15–17% is particularly advantageous.

Increasing the whole wheat kernel moisture content to at least about 14% is necessary as a preliminary to pin (impact) milling wherein the kernel is effectively reduced in particle size. Unless the kernel moisture content is at least 14% prior to milling the germ and starch will be damaged during particle size reduction. Moreover, the present process is fundamentally a whole wheat kernel component fractionation process. As such, it is particularly desirable to maintain the bran as intact as possible, i.e. to avoid shattering the bran, since in subsequent steps the ground bran and germ particles will be separated from the still more finely ground endosperm particles. Moisture content increase to at least 14% ensures that the bran remains reasonably plastic and therefore is ground to a lesser degree than the endosperm during milling.

Particle size reduction of the tempered whole wheat kernel is accomplished in a pin mill. Pin (impact) milling has been found to increase free endosperm yields by as much as four times compared to roller or flake milling with less damage to the starch component of the endosperm. Pin or impact mills are well known items of processing equipment and are generally commercially available. For example, pin mills suitable for use in the present process are available from Alpine American Corp. of Natick, Mass. under the registered trademarks Kolloplex and Contraplex. As is generally well known, a typical pin mill has two pinned discs with four circular rows of pins on each disc. One of the discs is stationary and the other rotates at high speed. Grinding is accomplished by percussion and impact action through an intermeshing of the pins on the two discs. The sample to be ground is fed into the mill at the center of the stationary disc. The inner row of pins has lower lineal velocities relative to the outer row of pins. The easy to grind material is ground by the slower pins while the harder to grind material requires higher velocities and is ground by the outer rows of faster pins.

During grinding in a pin mill, the brittle endosperm is crushed into flour-like particles (i.e. 5–10 microns in diameter) while the more plastic bran is ground to a lesser degree. It is this characteristic of pin mill grinding which facilitates separation of the bran and germ from the endosperm by sifting and thus permits separation prior to hydration and washing of the endosperm. Maximum endosperm yields with maximum damage to starch, gluten, bran and germ can be achieved by operating the pin mill at about medium speed, i.e. in the range 11,000–20,000 rpm and preferably about 17,000 rpm.

By comparison with a pin mill, which grinds primarily by impact, a hammer mill employs attrition and shear as well as impact; and a roller mill and a disc mill employ attrition, compression and shear. It is believed that any form of grinding which employs shear as the operative mechanism inflicts too much damage upon the kernel to be desirable for use in the present kernel fractionating process.

Following milling, the kernel components, which are now in particle form, are sieved to separate the relatively large bran and germ particles from the relatively small endosperm particles. Preferably, the bran-germ fraction is sieved from the endosperm using a conventional vibrating screen, such as is commercially available from Smico Corp., Oklahoma City, Okla. under the name Gyroset. It will be appreciated, however, that any type of sieve can be employed to effect the particle separation. Further separation of bran and germ from each other is achieved using a modified gravity table such as may readily be commercially obtained.

Separation of the endosperm from the bran and germ early in the processing is highly desirable for a number of reasons. First, the early separation reduces the amount of water washing subsequently necessary and thus reduces water consumption. Second, and more importantly, problems associated with color or pigmentation transfer from the bran to the final product are eliminated. Specifically, it has been noted that when the bran, germ and endosperm are processed together in water, the soluble coloring matter (which may consist of pigments, vitamins, and the like) naturally associated with the germ and the outer layers of the bran is extracted by the aqueous solution and contaminates the starch and gluten. This coloring material transfer to the starch and gluten is undesirable because it adds unwanted color to the final products; it reacts within the reactive sites of the endosperm during prolonged storage, thus reducing shelf life and adversely influencing the product flavor; and the presence of the reaction products of the coloring material in the reactive sites reduces the nutritive value of the products. It is to avoid the foregoing problems that the steps of pin milling followed by bran-germ separation from the endosperm are critical to the present process.

In addition, as previously indicated, pin milling the tempered wheat kernel permits significantly greater endosperm yields and reduces starch damage. To demonstrate the advantages of pin milling compared to roller and hammer milling in the present process, and to study the effect of tempering moisture content on the efficiency of separation and on the extent of starch damage in the endosperm, a number of comparative tests were conducted on the whole wheat kernel, as set forth in Example I.

EXAMPLE I

Whole wheat kernels were tempered in water, as necessary, at room temperature for a time sufficient to attain the desired kernel moisture contents in the range 10 to 14%. The tempered kernels at each moisture content, 10, 12, 14, 16, 18, 20, 22 and 24%, were separated into three equal portions. One portion was pin milled; one portion was hammer milled; and one portion was roller milled. In each case, commercially available standard mills were used. The ground kernels from each mill were then sifted through a vibrating screen. The particles passing the sieve (endosperm) were analyzed for percent starch damage. The particles retained on the sieve, presumably bran-germ, were analyzed for percent residual starch to measure the actual effectiveness of the separation. Starch analyses were accomplished using conventional sodium thiosulfate titration techniques.

The results of the tests and analyses are set forth in Table I.

TABLE I

| Type of Mill Used | Percent Moisture in the Tempered Wheat | Analysis of Sieved Fractions Bran-Germ % Residual Starch | Endosperm % Starch Damage |
|---|---|---|---|
| A. Pin Mill | 10 | 26.3 | 5.9 |
|  | 12 | 19.2 | 4.7 |
|  | 14 | 11.1 | 4.0 |
|  | 16 | 17.8 | 3.5 |
|  | 18 | 23.1 | 3.8 |
|  | 20 | 26.5 | 4.3 |
|  | 22 | 30.1 | 5.3 |
|  | 24 | — | 6.4 |
| B. Roller Mill | 10 | 59.0 | — |
|  | 12 | 60.2 | 5.0 |
|  | 14 | 59.5 | 5.1 |
|  | 16 | 58.9 | 5.1 |
|  | 18 | 60.2 | 5.1 |
|  | 20 | 61.2 | 5.2 |
|  | 22 | 62.5 | 7.8 |
|  | 24 | — | 9.0 |
| C. Hammer Mill | 10 | 55.2 | 3.1 |
|  | 12 | 51.2 | 3.9 |
|  | 14 | 50.5 | 4.3 |
|  | 16 | 52.9 | 4.2 |
|  | 18 | 56.2 | 4.0 |
|  | 20 | 64.5 | 3.8 |
|  | 22 | 72.5 | 3.4 |
|  | 24 | — | 3.3 |

Figure 3:
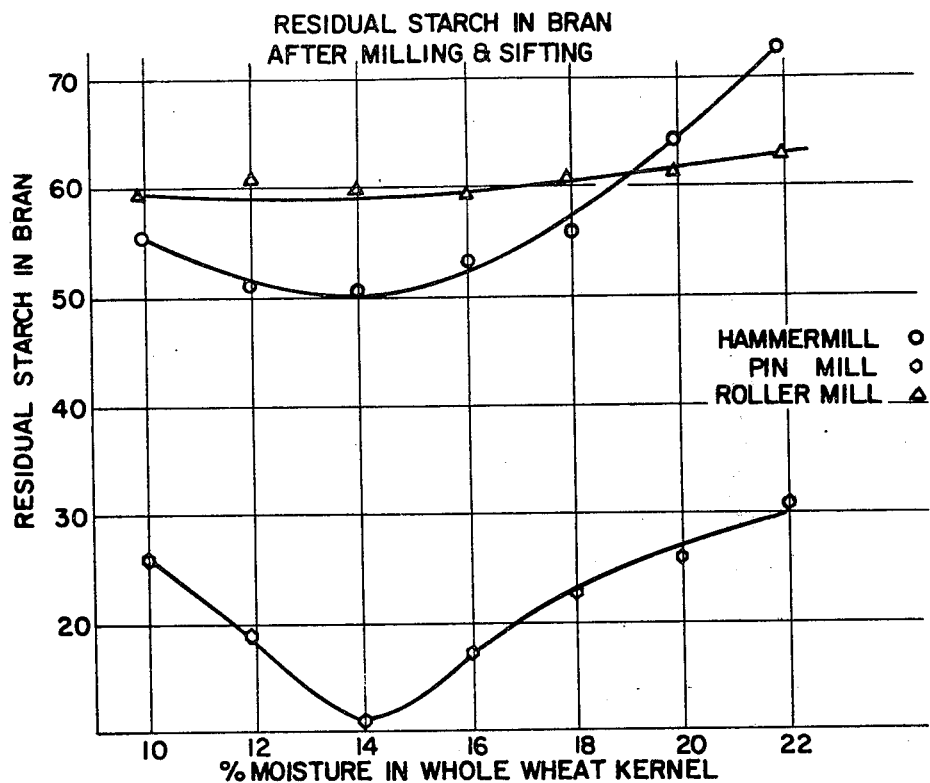
FIG. 3 is a graphical comparison of hammer, pin and roller milling effects on the percent starch remaining in the bran component of the kernel.
Figure 4:
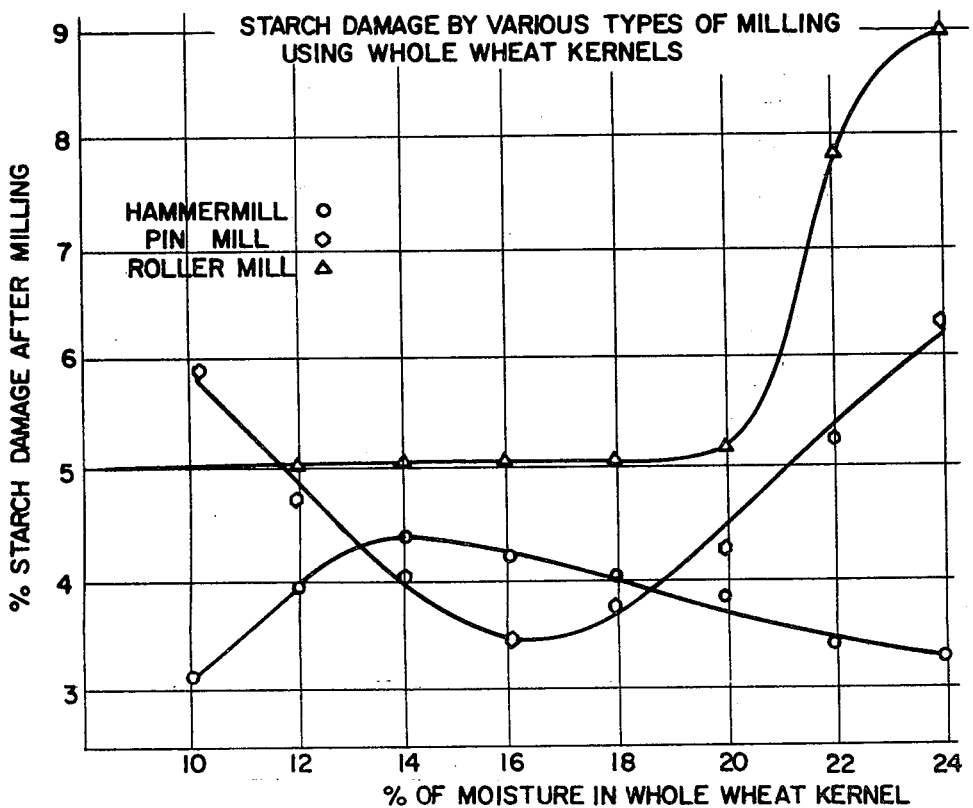
FIG. 4 is comparison graphical comparision of hammer, pin and roller milling effects on the percent starch damage after milling.

The above table and FIGS. 3 and 4 clearly show that milling the tempered wheat by a pin mill yields a product with minimum starch damage and high percentage yields of endosperm. Milling tempered wheat by a roller mill yields only flakes, and sieving gave poor yields of endosperm. Finally, milling through a hammer mill gave cracked wheat. Due to this cracking there is minimum starch damage, but yields of pure endosperm are very poor.

Following sieving the endosperm particles are hydrated and agitated to form a dough, i.e., to develop the constituent wheat gluten-starch into a cohesive elastic mass. The hydrating water may vary in temperature between 34°F. and about 120°F., but preferably is in the range 70°–90°F. Hydration of the endosperm is an extremely critical step in the present process since it is control of the extent of hydration which allows effective gluten-starch separation. Unlike prior art processes which utilized wheat flour as the starting material and which intentionally hydrated the four with excess water (i.e. excess beyond the amount needed to saturate the flour) to form a thin, slurry-like dough, it is important when effecting gluten-starch separation in the present process to hydrate with only limited quantities of water. In accordance with the present process, it is intended to hydrate the endosperm particles just sufficiently to achieve saturation, with the objective of forming a thick, dough-like mixture having no excess water, i.e. no water beyond that required to saturate the endosperm. In this connection the words "just saturated" or the like are intended to describe the dough-like mass or mixture containing no excess water. The amount of water added to hydrate the endosperm particles is therefore very important. It has been observed that use of more than the hereinafter prescribed quantity of hydrating water forms a slimy slurry from which subsequent gluten-starch separation is largely ineffective.

The object of the hydration step is to just saturate the endosperm to form a thick, cohesive mixture or mass with no excess water present. It will be appreciated that the quantity of water necessary to accomplish this will vary depending upon the moisture content of the endosperm as well as upon the saturation limit of the particular type of wheat (generally in the range 45–55%). Thus, for endosperm particles which have moisture contents in the range 11 to 22%, by weight, the amount of hydrating water necessary to just reach saturation varies from about 65 to 75% by weight of the endosperms to be hydrated. Addition of more than 75% water is to be scrupulously avoided lest a thin slurry result from which component separation is inefficient. Less than 65% water will generally be insufficient to achieve saturation. Generally, hydration of the endosperm from the tempered moisture content to final saturation moisture content, with mixing about every hour, requires from 15–20 hours at room temperature.

Separation of the thick, dough-like mass into its gluten and starch components is accomplished by mechanically working the mass while continuously spraying it with wash water. A simple but efficient dough washer is designed to separate the starch, by water washing, from the gluten. The washer consists of a perforated trough having a spiral screw operating therein to convey the hydrated endosperm through the trough. The endosperm is continuously washed by water from high pressure spray nozzles disposed along the length of the trough.

The trough preferred for use in the present process has perforations therein ranging from about 5/32 to 7/32 inches in diameter. The wash water is at a temperature in the range 60–90°F., and preferably about 80°–85°F. As the hydrated mass is mechanically manipulated and kneaded by the screw conveyor, the starch is continuously washed from the hydrated gluten and passes in the wash water through the perforations (i.e. it is filtered) into a holding tank for subsequent further purification and drying by conventional techniques well known to the art. If the wash water temperature exceeds about 90°F. the gluten becomes slimy and difficult to recover. At wash water temperatures below about 60°F. the gluten becomes tough. The vital wheat gluten is retained in the trough after most of the starch has been washed therefrom and then is recovered for further processing. A particular advantage of this type of dough washer is that the non-gluten components of the endosperm are continuously transferred away from the gluten with the wash water. In prior processes, using drumtype washers, the hydrated dough or partially purified gluten was always in contact with wash water consisting of starch and fiber which recontaminated the gluten.

Final purification of the gluten is preferably achieved by subjecting the hydrated gluten, now containing substantially less starch than before it was passed through the dough washer, to a further wash in a gluten washer wherein mechanical manipulation of the gluten mass consists of continuous cutting and shredding, lifting and stretching the gluten to thoroughly expose it to a countercurrent flow of wash water having a temperature in the range 60°–90°F. In one form of gluten washer, a continuous spiral ribbon conveyor operates concentrically in a perforated trough to simultaneously cut, shred and transport the gluten mass along the length of the trough. The conveyor is supported from a concentric shaft which also includes radially extending, generally triangular, paddles to scrape the gluten from the sides of the trough and to lift and move it from one side of the trough to the other. The paddles also stretch the gluten as it is conveyed through the trough to efficiently expose it to the wash water. As with the dough washer, the starch is washed through the perforations into a holding tank for subsequent further purification and drying by conventional techniques well known to the art. The purified gluten can then be recovered from the trough and dried.

In the schematic representation of one form of the present process, the whole wheat kernels are received for processing and transported via a bucket elevator 10 to storage bin 12. When processing is to commence, the kernels from bin 12 are conveyed via a screw conveyor 14 and bucket elevator 16 to a gravimetric feeder 18 which meters the kernels through a blender 20 into a tempering tank 22. In the tank 22, the moisture content of the kernels is raised to the desired level after which the tempered kernels are metered through gravimetric feeder 24 into pin mill 26. In the mill, the kernel is ground in such a manner that the relative particle sizes of the resulting germ and bran particles are substantially greater than the particle size of the resulting endosperm particles. This difference in particle size permits sifting in sieve 28 to separate the bran and germ from the endosperm. The former are directed from the sifter to a modified gravity table 30 where the bran is separated from the germ. The endosperm particles pass through sieve 28 and are hydrated to saturation in continuous dough mixer 32. The hydrated endosperm mass is directed next to a dough washer 34 wherein it is subjected to a continuous water spray while being mechanically worked in a perforated trough. The starch is washed through the perforations into a tank for further purification while the gluten is subjected to further purification in a gluten washer 36. In washer 36 the gluten mass is continuously cut and stretched to expose the starch therein to a countercurrent flow of wash water which washes the starch through perforations in the washer into a tank for further purification. The gluten mass, containing a small quantity of residual starch, is then dried for use.

While the present invention has been described with reference to particular embodiments thereof, it will be understood that numerous modifications may be made by those skilled in the art without actually departing from the scope of the invention. Accordingly, all modifications and equivalents may be resorted to which fall within the scope of the invention as claimed.

We claim:

1. A process for fractionating the whole wheat kernel into its components comprising the steps of:
    a. tempering whole wheat kernels in water to a moisture content, by weight, in the range from 14 to 22%;
    b. pin milling the tempered whole wheat kernels into bran, germ and endosperm particles, said bran and germ particles being larger than said endosperm particles;
    c. separating the bran and germ particles from the endosperm particles;
    d. hydrating said separated endosperm particles in an additional quantity of water ranging from 65 to 75% by weight of said endosperm particles to be hydrated and in an amount just sufficient to achieve a saturation moisture content and agitating the endosperm particles and water to form a thick, dough-like mass; and e. mechanically working the dough-like mass in the presence of water to wash the non-gluten endosperm components for the gluten.

2. A process, as claimed in claim 1, wherein said wheat kernels are tempered to a moisture content of from 14 to 18% by weight.

3. A process, as claimed in claim 2, wherein said wheat kernels are tempered to a moisture content of from 15 to 17% by weight.

4. A process, as claimed in claim 1, wherein said mechanical working is accomplished by kneading, stretching and cutting said mass.

5. A process, as claimed in claim 4, wherein said mechanical working is accomplished in two distinct steps, the first step comprising kneading said dough-like mass and the second step comprising continuously cutting and stretching said dough-like mass.

6. A process, as claimed in claim 1, wherein said dough-like mass is subjected to a continuous flow of water during mechanical working.

7. A process, as claimed in claim 1, wherein said non-gluten endosperm components are retained in the wash water and are separated from the gluten by filtration.

8. A process, as claimed in claim 7, wherein said non-gluten endosperm components consist essentially of starch.

9. A process, as claimed in claim 1, including the additional step of drying the gluten after separation thereof from the non-gluten endosperm components.

10. A process, as claimed in claim 1, including the additional step of separating said germ particles from said bran particles.

11. A process, as claimed in claim 1, wherein said bran and germ particles are separated from said endosperm particles by sifting.

12. A process as claimed in claim 1, wherein said non-gluten endosperm components in the wash water are continuously transferred away from said gluten.

13. A process for fractionating the whole wheat kernel into its bran, germ and endosperm components comprising the steps of:

a. tempering whole wheat kernels in water at a temperature from 70°–90°F., to a moisture content, by weight, in the range from 14 to 22%;

b. pin milling the tempered whole wheat kernels to particulate form, the resulting bran and germ particles being larger than the resulting endosperm particles;

c. sifting said particles to separate the bran and germ particles from the endosperm particles;

d. hydrating said separated endosperm particles in a quantity of water ranging from 65 to 75% by weight of the particles to be hydrated and in an amount just sufficient to achieve a saturation moisture content and agitating the particles and water to hydrate the endosperm and to form a thick, dough-like mass; and e. mechanically manipulating said mass while washing said mass with water at a temperature in the range 60°–90°F. to separate the non-gluten endosperm components from the gluten and continuously leading said wash water away from said gluten.

14. A process, as claimed in claim 13, wherein said mechanical manipulating comprises kneading, cutting and stretching said dough-like mass.

15. A process, as claimed in claim 13, including the additional step of separating said germ particles from said bran particles.

* * * * *